UNITED STATES PATENT OFFICE.

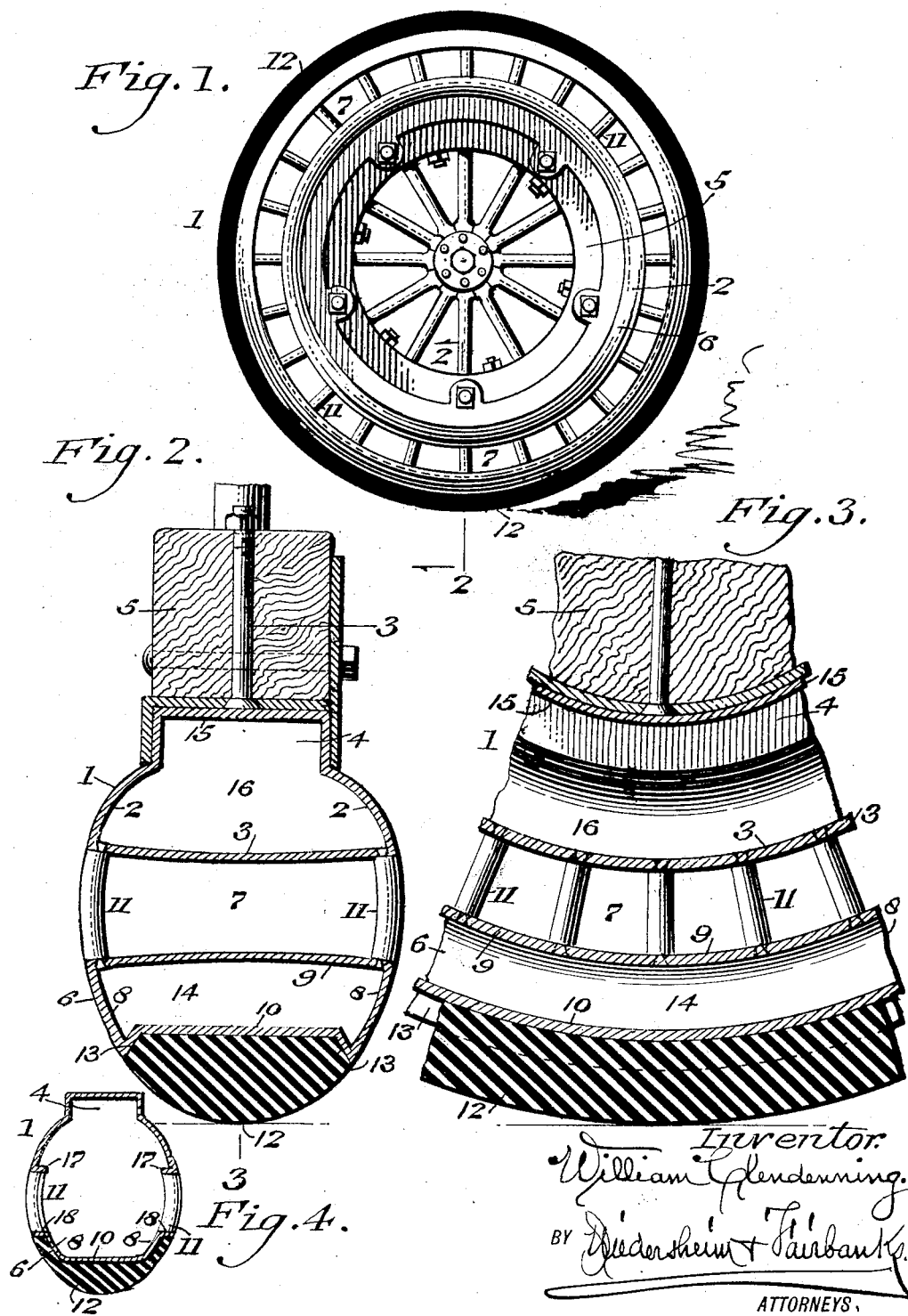

WILLIAM CLENDENNING, OF PHILADELPHIA, PENNSYLVANIA.

TIRE.

1,354,431.  Specification of Letters Patent.  Patented Sept. 28, 1920.

Application filed April 14, 1920. Serial No. 373,703.

*To all whom it may concern:*

Be it known that I, WILLIAM CLENDENNING, a citizen of the United States, residing in the city and county of Philadelphia, State of Pennsylvania, have invented a new and useful Tire, of which the following is a specification.

My invention consists of a resilient tire for a wheel, the same being provided with a resilient tread which obviates the employment of an inflatable tube and is constructed of hollow shells and post-like connections therefor forming a circular frame or body of skeleton form which is resilient, light and inexpensive in its nature, it being adapted to carry and support said tread and to be connected with the felly or circumferential rim of a wheel.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a side elevation of a wheel having thereon a tire embodying my invention.

Fig. 2 represents a section of a portion on line 2—2 Fig. 1 on an enlarged scale.

Fig. 3 represents a section of a portion on line 3—3 Fig. 2.

Fig. 4 represents a transverse section of another embodiment of the invention.

Similar numerals of reference indicate corresponding parts in the figures.

Referring to the drawings.

1 designates an inner annular shell which is composed of the metallic side plates 2, the wall 3 on the outer edges of said plates 2 connecting the same, and on their inner edges the neck 4 which is secured in any suitable manner to the felly 5 of a wheel.

6 designates an outer annular shell which concentrically encircles the inner shell 1 with a space 7 intervening said shells, said shell consisting of the metallic side plates 8, the wall 9 on the inner edges of said plates 8, and the inwardly depressed rim 10 on the outer edges of said plates 8.

11 designates a series of radially arranged spaced apart posts or pedestals on the sides of the space 7 their ends being secured respectively to the outer sides of the walls 3 and 9 and so connecting the shells 1 and 6.

12 designates a circumferential cushion of rubber or other resilient material which is seated in the depression of the rim 10 and retained in position therein by the shoulders 13 on the outer sides of the plates 8, said shoulders embracing the adjacent portions of the sides of said cushion, it being noticed that said cushion comprises the tread of the tire and consequently of the wheel.

The pedestals 11 are formed of suitable steel bars, rods or heavy wire material and being somewhat curved are resilient in their nature and provide resilient bearings for the shells 1 and 6 on each other, and so rendering the tire and consequently the wheel highly resilient in its nature, whereby an inflatable tube is obviated, while should the tread 12 be punctured no harm will be occasioned even if a nail, pin, etc., penetrates the same to the wall 10.

It will be seen also that the rim 10 and the wall 9 are separated from each other by the space 14, the walls 3 and 9 are separated from each other by the space 7, and the wall 3 is separated from the transverse wall 15 of the neck 4 by the space 16, thus constructing the body of the tire of skeleton form which is light, strong and inexpensive in its nature.

In Fig. 4 I show narrow flanges 17 and 18 in lieu of the walls 3 and 9, and the tread is extended inwardly to embrace the exterior of the side plates 8 of the shell 6 without, however, materially producing different results.

Having thus described my invention what I claim as new and desire to secure by Letters Patent, is:—

1. In a wheel tire, a body composed of concentric hollow shells, and posts intervening said shells adapted to connect the latter.

2. In a wheel tire, a body composed of concentric hollow shells embodying adjacent walls and resilient posts intervening said walls and joining the same.

3. In a wheel tire, a body composed of concentric hollow shells embodying adjacent walls and resilient posts intervening said walls and joining the same, said posts being curved and forming resilient bearings for said shells.

4. A wheel tire consisting of an inner hollow shell, an outer hollow shell concentric therewith and separated therefrom by an intervening space, a series of spaced-apart posts adapted to connect the opposite walls of said shells, means on the inner shell for securing it to the adjacent member of the wheel, and a cushioning tread on the exterior of the outer shell.

WILLIAM CLENDENNING.

Witnesses:
JOHN A. WIEDERSHEIM,
N. BUSSINGER.